United States Patent Office.

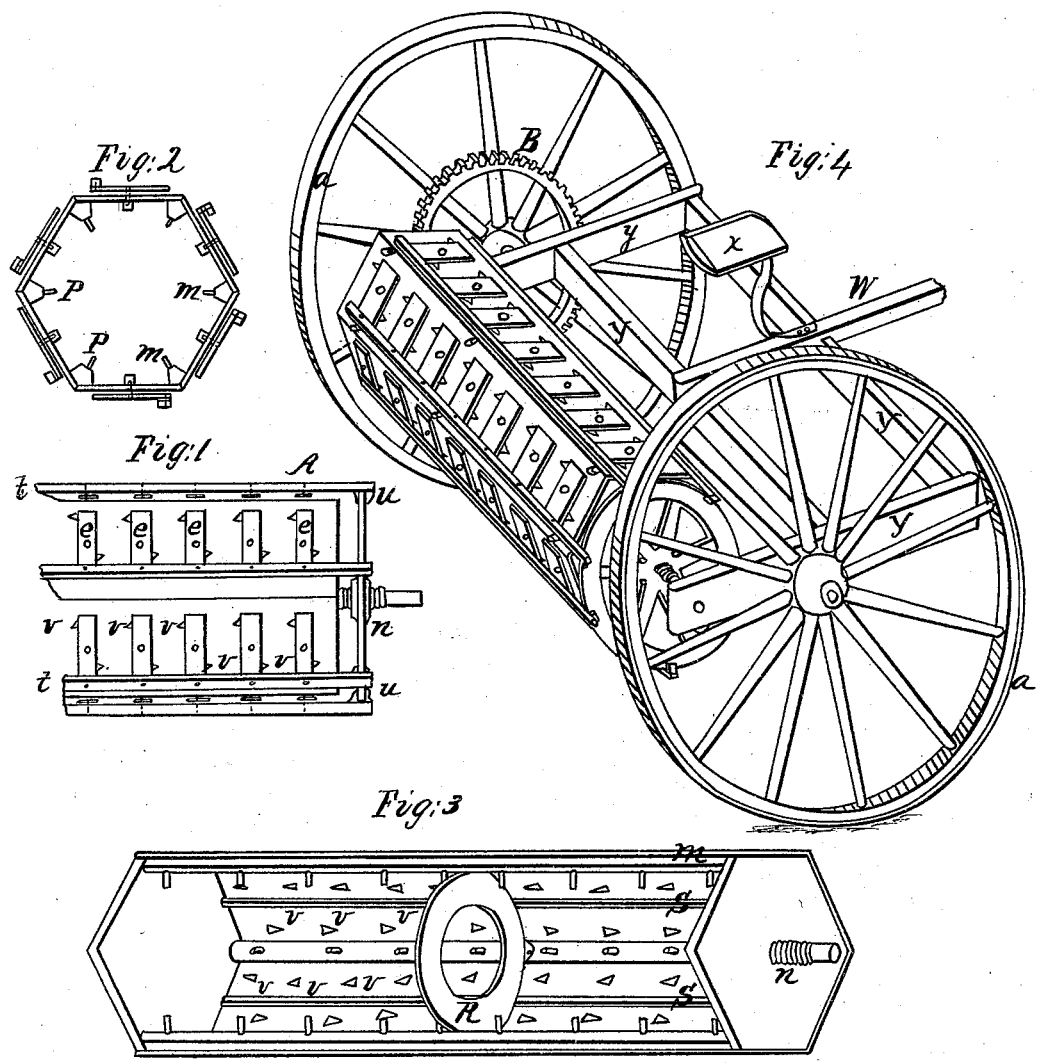

A. W. McKAY, OF ELKHART, INDIANA.

Letters Patent No. 93,729, dated August 17, 1869.

---

IMPROVEMENT IN MACHINE FOR SOWING PLASTER, GRASS-SEED, AND GRAIN.

---

The Schedule referred to in these Letters Patent and making part of the same.

---

*To all whom it may concern:*

Be it known that I, A. W. McKAY, of Elkhart, Elkhart county, State of Indiana, have invented a new and useful Improvement in Machines for Sowing Plaster, Grass-Seed, and Grain; and I do hereby declare that the following is a full, clear, and exact description of the construction and operation of the same, reference being had to the annexed drawings, making a part of this specification, in which—

Figure 1 represents the top view of the hexagonal box A; also, the valves or buttons $e$, and the wheel $n$, which, by turning, moves these buttons, so as to diminish or increase the quantity of plaster or seed to be sown.

Figure 2 represents an end view of the circumference of the hexagonal box.

Figure 3 represents the inside of the hexagonal box.

Figure 4 represents a perspective view of the machine.

This box is about ten inches in diameter, and about nine feet in length, having six angles, and bars of wood, $m$, at each angle, extending from one end of the box to the other end.

These bars are about one and a-half inch through, and nearly in hexagonal shape, and are placed in their position for the purpose of forming the frame-work of the box, and, to these bars, the sheet-iron, or other thin metal, forming the outward enclosure of the box, is nailed or screwed.

These bars, or their equivalent, must be there, or so placed to prevent the plaster or seeds from sliding when the box is revolving, as, in this case, the discharge would be irregular, which is prevented by the bars lifting the plaster or grain, and giving it required motion.

In these bars, I drive pins, about three inches apart. These pins, (fig. 2, P,) are made of wire, one-eighth of an inch thick, and left standing out about half an inch, for the purpose of smashing or breaking up and pulverizing the plaster.

In the inside of the box, I have about four divisions, made of thin boards, or iron, (as shown in fig. 3, R,) for the purpose of preventing the plaster and seeds sliding and working to one end of the box, when passing or travelling on sideling or descending ground.

Between these bars just spoken of, and equal distance from each, I have six other bars, (fig. 3, S,) extending whole length of the box.

To these bars, I fasten my buttons or valves, by driving screws through the buttons down through the sheet-iron into these bars, which bars are about half an inch square.

I make these buttons of common hoop-iron, one inch wide, three and a half inches long, and punch a hole in each near the centre; also, punch another hole near one end; and before fastening them, as above written, I fasten them by wood screws, through the end holes, to a bar, (fig. 1, $t$,) and place them one inch apart.

This bar is one-half an inch square, and, the buttons being fastened or pivoted in their centre, and then fastened to this bar, as above specified, the size of the discharging-holes can be enlarged or diminished by moving this bar, or sliding it one way or the other, which movement is made by turning the wheel $n$, fig. 1, as this wheel acts (operates) the same as screwing a nut on or off a bolt, its periphery working between forks, $u$, fig. 1.

These discharging-holes are made or punched through the sheet-iron, equal distance from the centre of the button $v'$, and in a zig-zag manner, one on each side of each button $v'$, all of which is represented in fig. 1, and in fig. 3, where the holes are marked $v\ v\ v$.

I mount my box on a frame, made of four pieces of common three-by-four scantling, as represented in fig. 4, $y\ y\ y\ y$.

On each end of this frame, I have an axle, on which the carriage-wheels $a\ a$, fig. 4, revolve.

To one of these wheels, I fasten a cog-wheel, fig. 4, B, about one foot in diameter, which meshes into a pinion about four inches in diameter, which pinion is fastened to the axle on which the hexagonal box revolves, so as to give about three revolutions to the box to one of the carriage-wheel.

In making my box in hexagonal shape, there are six equal sides, each side being five inches wide; and, that the box may be easily filled, or replenished with plaster or grain, I hang one of these sides on hinges, so as to open and shut just like a horizontal door; and, when replenishing, I never fill the box more than two-thirds full, so that the seeds may have a free circulation, or be somewhat agitated, so as to bolt out through the holes evenly and freely.

W, in fig. 4, represents the tongue, to which the team is attached; and

X is seat for the driver.

What I claim, and desire to secure by Letters Patent, is—

1. The arrangement of the buttons or valves $v'$, in relation to the openings $v$, for closing or enlarging the latter, as specified.

2. The bars $m$, and pins P, in combination with the cylinder A, openings $v$, and valves $v'$, as specified.

A. W. McKAY.

Witnesses:
A. BUGBEE,
ROSALIE BEEBE.